United States Patent [19]

Mooney et al.

[11] Patent Number: 5,045,570

[45] Date of Patent: * Sep. 3, 1991

[54] ENDOTHERMIC BLOWING AGENTS FOR SURFACE MIGRATION OF COMPONENTS IN FOAMED PRODUCTS, COMPOSITIONS AND APPLICATIONS

[75] Inventors: Gerry Mooney, West Ajax, Canada; Rod A. Garcia, Orange, Tex.; Michael E. Tarquini, Havre de Grace; John A. Kosin, Bel Air, both of Md.

[73] Assignee: J. M. Huber Corporation, Rumson, N.J.

[*] Notice: The portion of the term of this patent subsequent to Jun. 24, 2008 has been disclaimed.

[21] Appl. No.: 467,585

[22] Filed: Jan. 19, 1990

Related U.S. Application Data

[63] Continuation-in-part of Ser. No. 352,307, May 16, 1989.

[51] Int. Cl.$^5$ ................................................ C08J 9/08
[52] U.S. Cl. ....................................... 521/88; 252/350; 252/183.12; 521/76; 521/91; 521/92; 521/93; 521/97; 521/122; 521/124; 521/125; 521/130; 521/57
[58] Field of Search .......................... 252/350, 183.12; 521/57, 76, 92, 88, 91, 92, 93, 97

[56] References Cited

U.S. PATENT DOCUMENTS

| Re. 26,278 | 10/1967 | Pottenger | 521/97 |
|---|---|---|---|
| 2,008,489 | 7/1935 | Cousins . | |
| 2,832,744 | 5/1958 | Soule et al. . | |
| 2,912,379 | 11/1959 | McCracken et al. . | |
| 3,055,846 | 9/1962 | Flack et al. . | |
| 3,350,306 | 10/1967 | Alletou . | |
| 3,645,931 | 2/1972 | Normanton . | |
| 3,979,318 | 9/1976 | Tokiwa et al. . | |
| 4,156,039 | 5/1979 | Klebe et al. . | |
| 4,218,511 | 8/1980 | Hahn et al. . | |
| 4,456,572 | 6/1984 | Eguchi et al. | 521/910 |
| 4,522,955 | 6/1985 | Fukershima et al. | 521/143 |
| 4,614,648 | 9/1986 | Bru . | |
| 4,623,478 | 11/1986 | Pastorino . | |
| 4,632,942 | 12/1986 | Ito | 521/92 |
| 4,638,015 | 1/1987 | Bertrand | 521/143 |

*Primary Examiner*—Morton Foelak
*Attorney, Agent, or Firm*—Harold H. Flanders; Alec H. Horn; Robert L. Price

[57] ABSTRACT

Compositions for producing foamed products which include additives and blowing agents which cause the surface treatment additives to migrate to the surfaces of foamed products. The products produced from the compositions require less additives because the incorporated additives are concentrated at the surface thereof.

10 Claims, No Drawings

ENDOTHERMIC BLOWING AGENTS FOR SURFACE MIGRATION OF COMPONENTS IN FOAMED PRODUCTS, COMPOSITIONS AND APPLICATIONS

RELATED APPLICATIONS

This application is a continuation-in-part of U.S. patent application Ser. No. 07/352,307, filed May 16, 1989.

TECHNICAL FIELD

The present invention relates to endothermic blowing agents for use in making foamed products such as cellular structured plastics or rubbers. In particular, the present invention relates to endothermic blowing agents which are used in combination with additives so as to enhance migration of the additives to surfaces of foamed products during their formation.

BACKGROUND ART

The term "foaming agent" or "blowing agent" is used to describe any substance which alone or in combination with other substances is capable of producing a cellular structure in a plastic or rubber mass. Thus, the term includes gases which expand when pressure is released, soluble solids that leave pores when leached out, liquids which develop cells when they change to gases, and chemical agents that decompose or react under the influence of heat to form a gas.

Known liquid foaming agents include certain aliphatic and halogenated hydrocarbons, low boiling alcohols, ethers, ketones, and aromatic hydrocarbons. Chemical foaming agents range from simple salts such as ammonium or sodium bicarbonate to complex nitrogen releasing agents, of which azobisformamide is an important example.

Foaming agents, also known as chemical blowing agents (CBA's) can be utilized in all conventional plastics processes, such as extrusion, calendering, injection molding, coating, expansion casting, and rotational molding.

Recognized advantages of foamed plastics include reduction in density, savings in material costs, improved electrical and thermal insulative properties, increased strength to weight ratio, and the elimination of shrinkage, warpage, and sink marks in injection molded parts. Foamed plastic products include such diverse items as vinyl flooring, insulated food containers, structural foam furniture, business machine housings, simulated leather, and foamed core pipe.

Foaming agents are generally classified as physical or chemical. Chemical foaming agents (generally solids) undergo a chemical transformation when producing gas, while physical foaming agents undergo a generally reversible physical change of state. e.g., vaporization.

The two major categories of physical foaming agents include both liquids and gases. The gas most often is compressed nitrogen. In injection molding processes which utilize physical foaming agents, the gas is injected under high pressure directly into the polymer during plastication, and the mixed polymer and gas are metered into the mold. When the pressure is relieved, the gas becomes less soluble in the polymer and expands, forming the cellular structure. Nucleating agents, in the form of finely divided powders and chemical foaming agents, sometimes are used with the gas to yield a finer cell structure.

The preference for nitrogen is due to the fact that nitrogen is inert, nonflammable, leaves no residue in the polymer, and is not temperature restrictive. However, the use of processes involving nitrogen is limited in the industry due to the requirement of licensed specialized equipment. Moreover, the process tends to produce foams with poorer performance and appearance than those produced by the use of exothermic chemical blowing compounds.

Liquid physical foaming agents include volatile liquids which produce gas through vaporization. Common liquid physical foaming agents generally include short-chain aliphatic hydrocarbons ($C_5$ to $C_7$) and their chlorinated and fluorinated analogs. Liquid physical foaming agents may be used over a wide temperature range in low pressure and atmospheric processes, and are widely used to produce low density thermoplastics, such as foamed polystyrene, and thermoset polymers, such as polyesters, epoxy, and polyurethane foam systems.

Chemical foaming agents commonly referred to as blowing agents are generally solids that liberate gas(es) by means of a chemical reaction or decomposition when heated. They are necessarily selected for specific applications or processes based on their decomposition temperatures. In this regard, it is important to match the decomposition temperature with the processing temperature of the polymer to be foamed. If the polymer processes at temperatures below that of the chemical foaming agent, little or no foaming will occur. If the process temperature is significantly above the foaming agent's decomposition temperature, poor (overblown, ruptured) cell structure and surface skin quality will likely result.

Chemical foaming or blowing agents may be either inorganic or organic. The most common inorganic foaming agent is sodium bicarbonate. Sodium bicarbonate is inexpensive, nonflammable and begins to decompose at a low temperature; however, it is used only to a very limited extent in thermoplastics. Differential thermal analysis has shown that sodium bicarbonate decomposes over a broad temperature range and this range is endothermic, contributes to an open cell structure in the finished product, and the released gas (carbon dioxide) diffuses through the polymer at a much greater rate than nitrogen gas.

Presently used endothermic chemical foaming or blowing agents are mostly mixtures of sodium bicarbonate and sodium hydrogen citrate. The citrate is incorporated together with the sodium bicarbonate in order to facilitate a complete acid assisted decomposition reaction to produce carbon dioxide gas. The mixture is also available in various polymer concentrates at various loadings. The mixture is also available as a hydrophobized acid and carbonate which is a free non-dusting powder.

The major advantages associated with utilizing endothermic foaming or blowing agents over their exothermic counterparts include short degassing cycles, small cells, smooth surfaces, weight reductions, reduced cycle times, foamed products which have promptly paintable surfaces, the foaming process is odorless, and the components of the foaming agents are generally regarded as environmentally safe.

The major disadvantage of existing acid/carbonate systems involves the formation of corrosion on the process equipment. This corrosion is attributed to the action of the citric acid and sodium bicarbonate on the lesser grades of steel used in some equipment. Another disadvantage associated with existing acid/carbonate blowing agents is premature reaction with water or moisture of the blowing agents when they are associated with polymeric reaction mixtures. This premature reaction when occurring prior to a foaming process detrimentally effects the final products.

Organic foaming or blowing agents can be utilized in most polymer applications and processes. These compounds release gas (usually nitrogen and/or ammonia) over a narrow temperature range. The rate of gas evolution for a given chemical foaming or blowing agent is determined by a temperature and time relationship. Applications for chemical foaming agents are generally divided into three areas: low, medium and high temperature processing polymers. There are numerous organic foaming agents available that decompose at various temperatures.

Blowing or foaming agents are utilized in the initial process of forming foamed products. Conventional foaming processes include extrusion, calendering, injection molding, coating, expansion casting, rotational molding and the like. Often, after initial formation, foamed products are subjected to machining, surface treating and other various methods to achieve a final product.

Particular post-formation processes used in the fabrication of foamed products include surface treatment processes which produce barrier surfaces or layers which are flame retardatant, chemically inert, provide structural or mechanical strengths, and the like. Such surface treatments have heretofore been limited to post-formation process steps wherein foamed products are treated with various reactants, such as reactive gases which chemically modify the exposed surfaces.

The present invention is an improvement over the prior known chemical, endothermic foaming or blowing agents which provide a highly stable endothermic blowing agent that does not prematurely react with water or moisture and which reacts in a controlled fashion. These endothermic blowing agents are used in combination with additives to cause migration of the additives toward the surfaces of foamed products as they are formed. This migration of surface treatment additives during the formation of the foamed products eliminates the need for conventional post-formation surface treatment processes.

DISCLOSURE OF THE INVENTION

It is accordingly one object of the present invention to provide a novel endothermic blowing agent which has an enhanced stability, releases gas in a controlled manner, and is resistant to moisture absorption.

A further object of the present invention is to provide an endothermic blowing agent which does not contribute to the corrosion of processing equipment.

Another object of the present invention is to provide a combination of a blowing agent and additives or compounds which provide for surface treatment of foamed products during their formation.

Another object of the present invention is to provide for a polymeric concentrate for producing foamed products which incorporates the present endothermic blowing agents and additives or compounds.

A still further object of the present invention is to provide a method for producing foamed products utilizing the above endothermic blowing agents.

An even further object of the present invention is to provide for foamed products which have been produced by a process that utilizes the present blowing agents in combination with additives or compounds.

According to the above objectives, there is provided by the present invention endothermic blowing agents which include a polycarboxylic acid and an inorganic carbonate, each of which has been surface treated with a compound which prevents premature reaction due to water absorption. These blowing agents are used in conjunction with additives to cause the additives to migrate to the surfaces of foamed products.

Also provided by the present invention is a polymeric concentrate that includes the present endothermic blowing agents, additives, and various polymers.

The present invention further provides for a method to produce the above endothermic blowing agents and for foamed products that are produced by processes that utilize the endothermic blowing agents and additives.

BEST MODE FOR CARRYING OUT THE INVENTION

The powdered endothermic blowing agents of the present invention are produced by blending a surface treated polycarboxylic acid and a surface treated inorganic carbonate. The surface treatment of these materials can be performed in a high intensity mixer at a temperature range of between about 72° C. and about 135° C., with a preferred temperature being about 80° C. The preferred level of surface treatment is from about 0.1% to about 10%, and most preferably about 3% for the polycarboxylic acid and about 3% for the inorganic carbonate. The formation of the surface treatment within this preferred range has been found to be effective in avoiding premature reaction resulting from water absorption.

In surface treating the polycarboxylic acid, a typical laboratory batch is prepared by adding about 1500 grams of polycarboxylic acid, e.g., anhydrous citric acid to a 10 liter Henschel mixer or other suitable high intensity mixer. The polycarboxylic acid is mixed at about 1500 rpm and heated until a temperature of about 80° C. is reached. Any heating means such as hot water flowing through a water jacket surrounding the mixer may be used to attain the desired temperature. After reaching the desired temperature about 45.0 grams of a surface treating compound such as stearates, oleates, glyceryl monostearate and other suitable hydrophobic treatment compounds is added to the heated polycarboxylic acid and mixing is continued at about 1500 rpm and about 80° C. for an additional period of time of approximately five minutes. After five minutes the mixing speed is reduced to about 900 rpm and the mixture is allowed to cool below about 60°. Thereafter the surface treatment of the polycarboxylic acid is complete and the mixture is unloaded.

In surface treating the inorganic carbonate, about 3500 grams of an inorganic carbonate, e.g., dry sodium aluminum hydroxy carbonate, is charged into a 10 liter Henschel mixer. The inorganic carbonate is mixed at a speed of about 1500 rpm and heated by a suitable means such as a hot water jacket until a temperature of about 80° C. is reached After reaching the proper temperature about 108.2 grams of a surface treating compound such as glyceryl monostearate, is added to the inorganic carbonate and mixing is continued at about 1500 rpm for about five minutes while the temperature is maintained at about 80° C. After the required mixing, the mixing speed is reduced to about 900 rpm and the mixture is allowed to cool below about 60° C. Thereafter, the inorganic carbonate has been sufficiently surface treated and may be unloaded from the mixer.

In preparing a large scale batch of the above surface treated components, about 200 pounds of polycarboxylic acid, e.g. citric acid, was charged into a 200 liter Henschel mixer. The polycarboxylic acid was mixed until a temperature of about 68° C. was reached. In this case neither steam nor hot water was needed to raise the temperature. When the polycarboxylic acid reached a temperature of about 68° C. six pounds of a suitable surface treating component, e.g., glyceryl monostearate, was added to the mixer. Mixing continued until the temperature reached about 72° C. after which mixing was continued for an additional period of time of about 5 minutes. Thereafter the mixture was allowed to cool to below about 60° C. and was unloaded from the mixer. The batch surface treatment procedure was repeated for the inorganic carbonate using about 150 pounds of dry inorganic carbonate, e.g., sodium aluminum hydroxy carbonate, and about 4.5 pounds of the surface treating component, e.g., glyceryl monostearate.

The present endothermic blowing agents are prepared by blending together the surface treated polycarboxylic acid and the surface treated inorganic carbonate. In a preferred embodiment about 1029 grams of surface treated inorganic carbonate, e.g., sodium aluminum hydroxy carbonate, was placed into a 10 liter Henschel mixer together with about 1471 grams of surface treated polycarboxylic acid, e.g., citric acid. The mixture was mixed at about 1500 rpm for a period of time of about five minutes. Thereafter the mixing speed was reduced to about 900 rpm for a short period of time and unloaded from the mixture.

In the above discussion, the preferred polycarboxylic acid used was citric acid. However, for purposes of the present invention, other suitable carboxylic acids include those of the formula: HOOC—R—COOH where R is an alkylene group of 1 to about 8 carbon atoms which may also be substituted by one or more hydroxy groups or keto groups and may also contain unsaturation. Also included are salts and half salts. Preferred polycarboxylic acids include citric acid, fumaric acid, tartaric acid, sodium hydrogen citrate and disodium citrate.

The preferred inorganic carbonate utilized in the invention is sodium aluminum hydroxy carbonate. However, acceptable results are also achieved by also using sodium bicarbonate as well as alkali and alkaline earth metal carbonates and carbonates generally.

In the above examples glyceryl monostearate was utilized as the preferred surface treatment compound. However, surface treatment can be carried out utilizing any reagent which renders the polycarboxylic acid and the inorganic carbonate hydrophobic. In this regard, suitable surface treating components found useful for purposes of the present invention included various monoglycerides, diglycerides, stearic acid, fatty acids and salts, titanates, zirconates and silane coupling agents in addition to the above glyceryl monostearate.

In combining the surface treated polycarboxylic acid and the surface treated inorganic carbonate to produce the blowing agent the weight ratio of these two components needs to be determined based on the desired structure and composition of the final foam product to be produced. Typically, the weight ratio of surface treated polycarboxylic acid to surface treated inorganic carbonate may vary from about 0.25 to about 10.00. However, the weight ratio is preferably maintained between about 0.5 and about 1.5.

The endothermic blowing agent is preferably used by incorporating it into a polymeric concentrate which is used to produce foam products. In one embodiment according to the present invention the polymeric or plastic concentrates were prepared at loading levels of from about 5% to about 50% in a single or twin screw extruder utilizing normal techniques known to those schooled in the art of plastic compounding. The extruder must, however, be operated below about 149° C. in order to keep the endothermic blowing agent from foaming prematurely.

In these polymeric or plastic concentrates citric acid may be replaced by other polycarboxylic acids such as fumaric acid, tartaric acid and sodium hydrogen citrate and other acid salts. The novel interaction between the polycarboxylic acid and the inorganic carbonate controls the composition and the volume of the above gases which serve to foam a plastic for foamed products.

The application areas for these endothermic products include polyvinyl chloride, polyolefins, engineering resins, polystyrene, polyphenylene oxide and other polymeric systems. These foamed products display excellent weight reduction and drop weight impact properties and are outlined in the following examples given by way of illustration only.

The blowing agents of the present invention have been found to unexpectedly cause migration or flotation of various platelet fillers, flame retardants, and polar resin systems to the inner and outer surfaces of foamed products when used in combination with the blowing agents, thereby forming barrier surfaces in the foamed articles.

In particular, it has been discovered that platelet fillers, such as mica or talc, can be made to migrate to the inner and outer surfaces of polymers. The platelet filler migrates under the pressure and dilution gas laws of an endothermic chemical blowing agent in fabricated parts such as pipe, blow molded containers, and 1-10 mil film. Pipe extrusion studies with mica at 5-50% levels in combination with the above blowing agents at 0.1 to 2.0% active levels have exhibited mica migration to both the inner and outer surface of 1" diameter pipe samples. Control samples without the endothermic blowing agents failed to migrate the mica particles to the surface. Similar test results with mica and endothermic blowing agents in 4 mil film has shown this mica migration to the resin surfaces.

Platelet flame retardants such as precipitated alumina trihydrate, magnesium hydroxide, magnesium carbonate, hydrotalcite, calcium aluminum hydroxide, and delaminated clays with an aspect ratio of at least 2:1 have also been made to migrate to the surface of thermoplastic resins with the addition of the above blowing agents. By migrating the flame retardant to the surface of the polymer, the loadings required to achieve flame retardant properties are reduced.

In further expanding this barrier technology, highly polar resins such as ACN, PVA, EVOH, and DuPont Selar RB have been made to migrate by the use of the above blowing agents. These polar resins (at 5-50% loadings) enhance the barrier properties of blow molded containers or injection molded parts toward gasoline and aggressive chemical environments.

The blowing agent migrates the polar resin system to both surfaces of the blow molded container. This method creates a novel barrier surface which will resist and meet current automotive fuel permeation requirements. The novel barrier technology is simple, cost effective, and requires no major machine modifications. In addition to automotive fuel tanks, the biggest potential for growth of this technology is in the area of industrial, household and agricultural chemical containers.

As described in detail above, the present invention involves endothermic blowing agents which are mixtures of polycarboxylic acids and inorganic carbonates, wherein the polycarboxylic acids and the inorganic carbonates each have been surface treated with a component that prevents water from being absorbed thereby. This endothermic blowing agents are used in combination with additives or compounds and cause migration of these additives to the surfaces of foamed products during their formation.

The level of surface treatment of the polycarboxylic acid and the inorganic carbonate is between about 1.0 and 5.0 percent by weight. In a preferred embodiment the level of surface treatment of said polycarboxylic acid is about 3.0 percent by weight and the level of surface treatment of said inorganic carbonate is about 3.0 percent by weight.

The ratio of the polycarboxylic acid and the inorganic carbonate may vary over a wide range and will be determined by the final desired products. Generally, the weight ratio of the surface treated polycarboxylic acid to the surface treated inorganic carbonate is between about 0.25 and about 10.00, with a more desired weight ratio being between about 0.50 and about 1.50.

As further discussed in detail above, the present invention also involves a method of making the endothermic blowing agent. Generally, this method involves the steps of:

(a) heating a dry powder of polycarboxylic acid to a temperature of between about 68° C. and about 80° C. and adding thereto a surface treating component to form a surface treated polycarboxylic acid;

(b) heating a dry powder of an inorganic carbonate to a temperature of between about 68° C. and about 80° C. and adding thereto a surface treating agent to form a surface treated inorganic carbonate and;

(c) mixing together the surface treated polycarboxylic acid and the surface treated inorganic carbonate to form the endothermic blowing agent.

In this method, each of the steps is performed in a high intensity mixer in which the components are agitated.

The endothermic blowing agent is ideally incorporated into a polymeric concentrate that is used for producing foamed products. The polymeric concentrate includes both the endothermic blowing agent, a polymer reaction mixture and one or more additives or compounds. Particular polymer reaction mixtures are those that may be used to produce polymers of polyvinyl chloride, polyolefins, engineering resins, polypropylene and polystyrene.

Finally, the present invention involves foamed polymeric products that have been produced by both the above blowing agents and the above discussed polymeric concentrates. Such products may be made by processes that involve either extrusion, calendering, injection molding, coating, expansion casting or rotational molding. These products have sufficient concentration of the additives or compounds to render them sufficiently flame retardant, chemically inert or mechanically strong, depending on the particular additive incorporated.

Although the invention has been described with reference to particular means, materials and embodiments, from the foregoing description, one skilled in the art can ascertain the essential characteristics of the present invention and various changes and modifications may be made to adapt the various uses and characteristics thereof without departing from the spirit and scope of the present invention as described in the claims that follow.

What is claimed is:

1. A composition for producing a foamed product which comprises:
   at least one polymer component;
   an additive which comprises platelet fillers, flame retardants, polar resin systems, and dormant chemical blowing agents; and
   a blowing agent which causes said additive to migrate through said polymer component during a foaming process, said blowing agent comprising a mixture of a polycarboxylic acid and an inorganic carbonate, wherein said polycarboxylic acid and said inorganic carbonate have been surface treated with a component selected from the group consisting of mono- and di-glycerides, stearic acid, silane coupling agents, fatty acids, fatty acid salts, hydrotitinates, zirconates, and mixtures thereof.

2. A composition for producing a foamed product according to claim 1, wherein said polycarboxylic acid is selected from the group consisting of those of the formula HOOC—R—COOH and alkali metal salts thereof, wherein R is alkylene of 1 to 25 carbon atoms which may contain one or more hydroxy substituents and may also contain unsaturation.

3. A composition for producing a foamed product according to claim 2, wherein said polycarboxylic acid is selected from the group consisting of citric acid, fumaric acid, tartaric acid, sodium hydrogen citrate, monosodium citrate, and mixtures thereof.

4. A composition for producing a foamed product according to claim 1, wherein said inorganic carbonate is an alkali metal or alkaline earth metal carbonate.

5. A composition for producing a foamed product according to claim 1, wherein said inorganic carbonate is selected from the group consisting of sodium aluminum hydroxy carbonate, sodium bicarbonate and mixtures thereof, and said polycarboxylic acid is citric acid.

6. A composition for producing a foamed product according to claim 1, wherein said surface treating component comprises glyceryl monostearate.

7. A composition for producing a foamed product according to claim 1, wherein said additive is a platelet filler selected from the group consisting of mica, talc, clay, calcium aluminum hydroxide and mixtures thereof.

8. A composition for producing a foamed product according to claim 1, wherein said additive is a flame retardant selected from the group consisting of alumina trihydrate, magnesium hydroxide, magnesium carbonate, hydrotalcite, and mixtures thereof.

9. A composition for producing a foamed product according to claim 1, wherein said additive is a polar resin system selected from the group consisting of acrylonitride, polyvinyl alcohol, ethylene-vinyl acetate, Nylon and mixtures thereof.

10. A composition for foaming and surface treating polymer compositions which comprises:
- an additive which comprises platelet fillers, flame retardants, polar resin systems; and
- a blowing agent for foaming a polymer composition and for causing migration of said additive through the polymer composition, said blowing agent comprising a mixture of a polycarboxylic acid and an inorganic carbonate, wherein said polycarboxylic acid and said inorganic carbonate have been surface treated with a component selected from the group consisting of mono- and di-glycerides, stearic acid, silane coupling agents, fatty acids, fatty acid salts, hydrotitinates, zirconates, and mixtures thereof.

* * * * *